United States Patent
Zavala

(10) Patent No.: US 9,724,853 B2
(45) Date of Patent: Aug. 8, 2017

(54) BUILDING METHOD TO PRODUCE LIGHTWEIGHT BUILDING BLOCKS FROM CELLULOSE FIBRE

(71) Applicant: Econovate Ltd., Herts (GB)

(72) Inventor: Jose Raul Zavala, Herts (GB)

(73) Assignee: Econovate Ltd., Herts (GB)

(*) Notice: Subject to any disclaimer, the term of this patent is extended or adjusted under 35 U.S.C. 154(b) by 286 days.

(21) Appl. No.: 14/377,444

(22) PCT Filed: Feb. 7, 2013

(86) PCT No.: PCT/GB2013/050284
§ 371 (c)(1),
(2) Date: Aug. 7, 2014

(87) PCT Pub. No.: WO2013/117929
PCT Pub. Date: Aug. 15, 2013

(65) Prior Publication Data
US 2015/0375431 A1 Dec. 31, 2015

(30) Foreign Application Priority Data
Feb. 7, 2012 (GB) .................................. 1202061.6

(51) Int. Cl.
*B29C 43/02* (2006.01)
*B28B 1/52* (2006.01)
(Continued)

(52) U.S. Cl.
CPC .............. *B29C 43/02* (2013.01); *B28B 1/525* (2013.01); *C04B 18/241* (2013.01); *C04B 18/26* (2013.01);
(Continued)

(58) Field of Classification Search
CPC ................................................... B29C 43/02
See application file for complete search history.

(56) References Cited

U.S. PATENT DOCUMENTS

2007/0011973 A1* 1/2007 Sinclair .............. B29C 47/0004
52/503
2011/0094421 A1 4/2011 Brock

FOREIGN PATENT DOCUMENTS

EP 2154117 2/2010
WO 9532161 11/1995
(Continued)

OTHER PUBLICATIONS

Naundorf, "Compaction properties of pulps made from wood chips and cement", ZKG International, Jan. 1, 2005, 58(5):36-39.
(Continued)

*Primary Examiner* — Larry Thrower
(74) *Attorney, Agent, or Firm* — Andrus Intellectual Property Law, LLP

(57) ABSTRACT

This invention aims to provide a novel material to be used for the production of components used in the construction industry such as construction blocks, wall panels, floor and roof tiles, lintels and any other product that could use this novel material. The novel material is a paper concrete made with 50% to 90% of recycled paper in the base mixture. This invention also aims to provide a novel process for making a construction block with the base mixture of paper concrete. The process for making the lightweight building blocks with this paper concrete has three main steps with two stages each. The base mixture for the paper concrete is essentially interlinked with the process for making this construction block. The two first steps of the process are crucial to achieve the base mixture and the following step is crucial to achieve a construction block. Thereafter, there are possibilities for producing these blocks with different colors by adding pigment to the paper pulp at stage 1 and adding artistic molds to the molds on the block making machine in stage 6.

21 Claims, 2 Drawing Sheets

(51) Int. Cl.
      *C04B 28/02*       (2006.01)
      *C04B 18/24*       (2006.01)
      *C04B 18/26*       (2006.01)
      *E04C 1/00*        (2006.01)
      *B29K 1/00*        (2006.01)
      *B29K 103/08*      (2006.01)
      *B29L 31/10*       (2006.01)

(52) U.S. Cl.
      CPC ................ *C04B 28/02* (2013.01); *E04C 1/00*
          (2013.01); *B29K 2001/00* (2013.01); *B29K*
          *2103/08* (2013.01); *B29L 2031/10* (2013.01);
          *Y02W 30/92* (2015.05); *Y02W 30/97* (2015.05)

(56) References Cited

FOREIGN PATENT DOCUMENTS

| WO | 0002826 | 1/2000 |
| WO | 2006120353 | 11/2006 |
| WO | 2008104772 | 9/2008 |

OTHER PUBLICATIONS

International Search Report for PCT/GB2013/050284 dated May 30, 2013.
International Preliminary Report on Patentability for PCT/GB2013/050284 dated Jul. 21, 2013.

\* cited by examiner

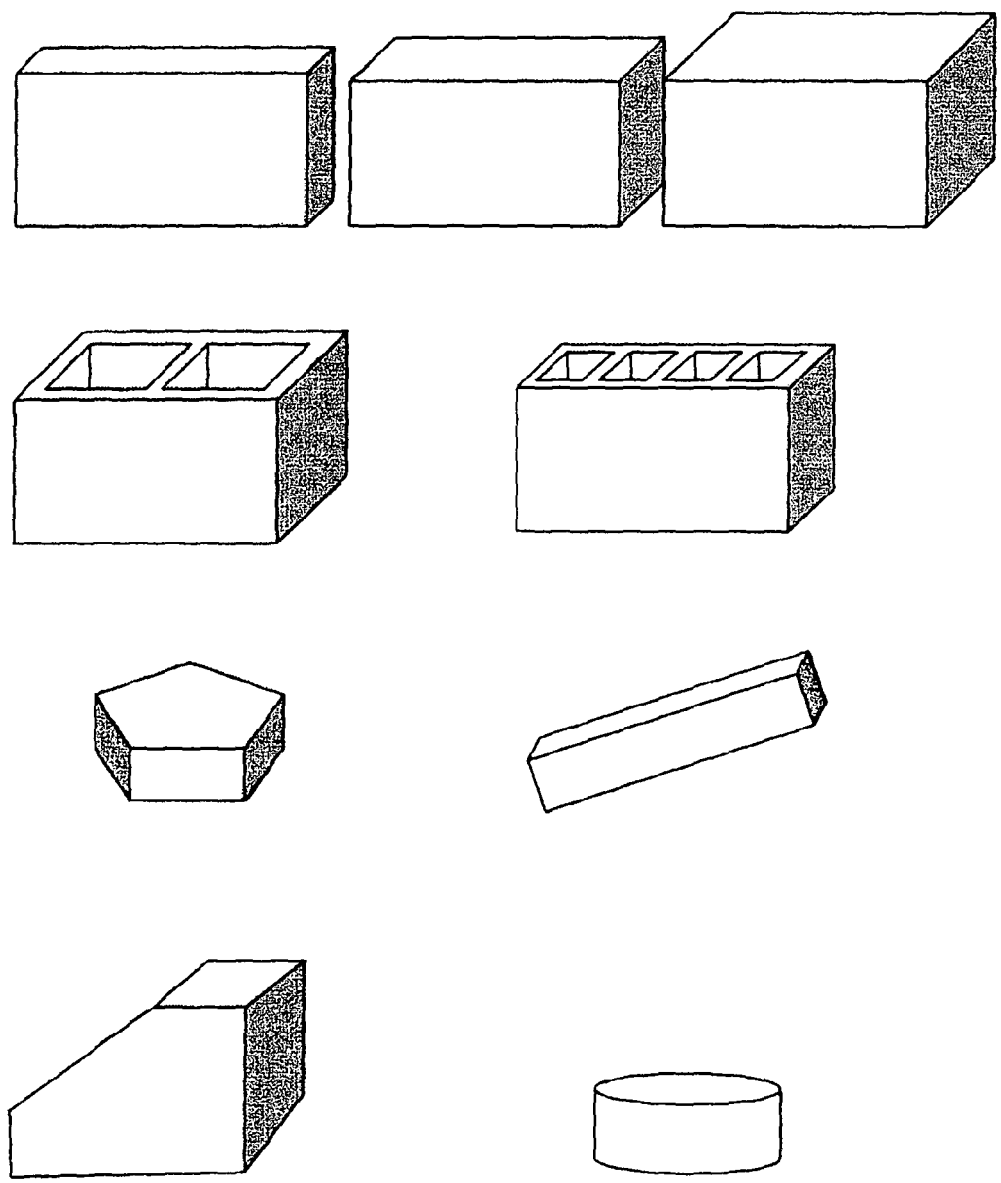
Figure No. 1

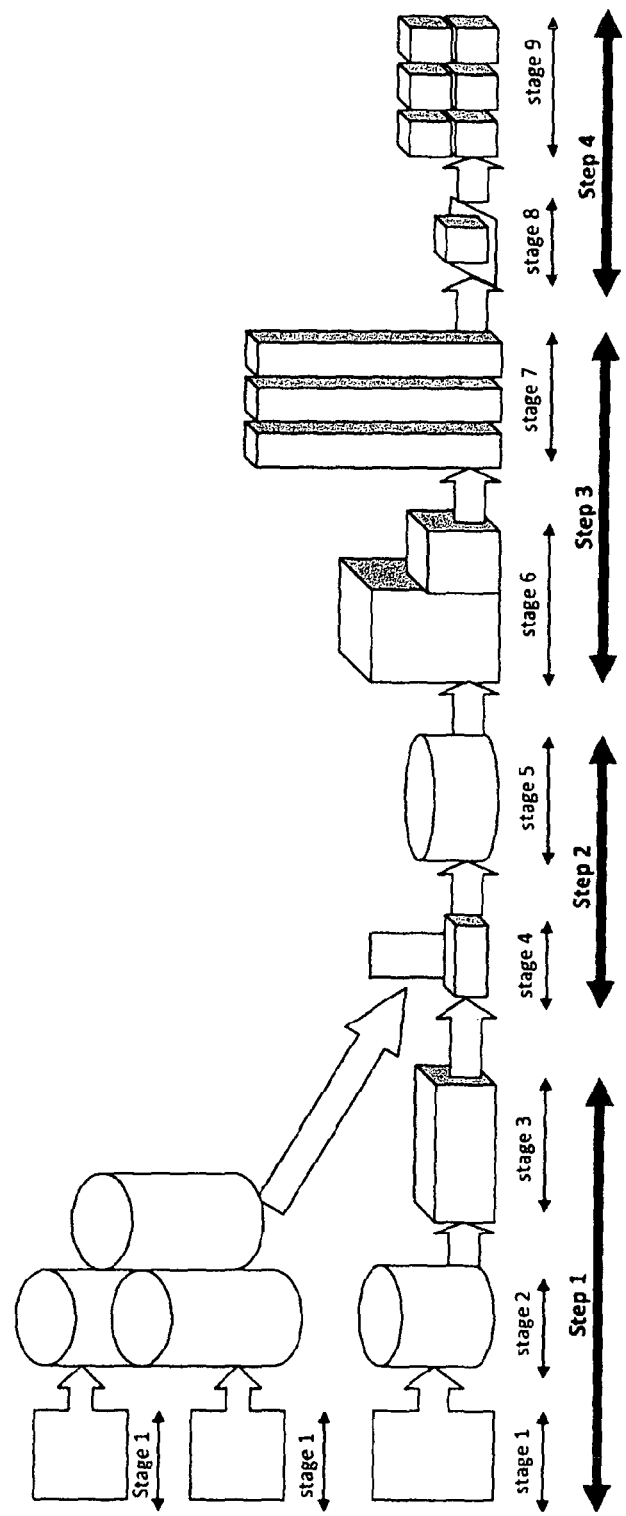
Figure No. 2

BUILDING METHOD TO PRODUCE LIGHTWEIGHT BUILDING BLOCKS FROM CELLULOSE FIBRE

CROSS-REFERENCE TO RELATED APPLICATIONS

The present application is the U.S. national stage application of International Application PCT/GB2013/050284, filed Feb. 7, 2013, which international application was published on Aug. 15, 2013, as International Publication WO2013/117929. The International Application claims priority of British Patent Application 1202061.6, filed Feb. 7, 2012, the contents of which are incorporated herein by reference in their entireties.

BACKGROUND OF THE INVENTION

1. Technical Field of the Invention

This invention relates to a process for making construction blocks of possible different shapes and sizes useful for various interior and exterior works such as construction of houses, buildings or walls suitable for said applications. The proposed invention is to utilise unconventional materials for the construction industry by reusing waste, e.g. from the paper industry from recycled paper or cardboard or from the wood industry, comprising cellulose fibre.

2. Description of the Related Art

In one side the outer walls of houses are conventionally built using breeze blocks laid with mortar. An additional, outer skin of bricks may then be laid with mortar. Inside the house the wall will be lined with plasterboard and then plastered to be ready to receive paint or wallpaper. The internal walls of a house will conventionally be of less substantial construction and will be lined on each side with plasterboard and plastered.

Conventionally construction blocks are made of a mixture of heavy aggregates, cement and sand, the weight gives the blocks stability and strength. These conventional blocks do not provide thermal insulation to the houses, but only are a structural element of a building.

Cellulose fibre in the form of waste paper is commonly used to produce more paper of different colour or sizes or to produce compressed card boards for various uses. Other wastes of cellulose fibre are wood shaving, sawdust and paper ash from bio-incinerators.

The United Kingdom generates 12,000,000 tonnes of waste paper and card per year and only 67% of this is recovered. 45% of the recovered waste is reutilised in England while the rest goes to foreign countries, mainly China, to be processed. The 33% not recovered still goes to landfills around the UK. This amount of waste being sent to landfill in the UK may increase in line with the instability of foreign markets and as a result of changing regulations. Research and recommendations done by WRAP (Waste & Resources Action Programme) point to a need to increase the reuse of waste in the UK to comply with the $CO_2$ emissions reduction for the country and to be prepared for foreign market instabilities. Furthermore, the recycling of 1 tonne of paper will save 3,000 liters of drinkable water and between 3,000 and 4,000 kW of electricity, enough to supply a three bedroom house for a year. Recycling may also reduce the amount of waste going to landfill, or being incinerated with the consequent pollution to the atmosphere, and in particular $CO_2$ emission.

There has been a technical prejudice against the use of paper and cardboard product in house walls because of fears of the risk of fire, cellulose materials generally being flammable.

Waste paper and wood waste has been used in construction in mixtures with hydraulic binders such as gypsum and cement, optionally in combination with other fillers such as sand and ash. For instance, in U.S. Pat. No. 5,350,451, a fibrous mixture of waste paper and water is formed in a blender and mixed with cement, de-watered and then formed into blocks. The dewatered slurry is moulded in forms using a hand roller to level off the top then allowed to dry by evaporation. The slurry before the dewatering step is formed of 1.8 kg of (4 lb pounds) of paper and 11.3 l (3 gallons) of water, and so has a water content of more than 80%. The slurry is mixed with 0.45 kg (1 lb) of cement, but the amount of water removed before forming the block is not specified.

In U.S. Pat. No. 7,867,432 a process is described comprising the steps of mixing the shredded cellulose fibers with water, together with sodium silicate, to form a first matrix; adding cementitious material and a water dispersing super plasticizer admixture to the first matrix; adding a viscosity modifier, water reducing admixture to the cementitious containing first matrix forming a thickened second matrix; adding additional water to the thickened second matrix; forming a building product from such thickened second matrix; and allowing said building product to cure. The building product may be formed into a block for use in construction. The cellulose fibres may be derived from waste paper. The uncured product is made up of between about 70 and 74% by weight water; between about 7 and 8% by weight shredded paper; between about 18 and 20% by weight cement; and, between about 0.1 and 0.4% by weight cement conditioning admixtures and is "flopped" to entrain 4-5% air by volume. It would be desirable to avoid tile addition of sodium silicate, plasticisers and viscosity modifiers.

In U.S. Pat. No. 5,785,419 mixture from which a lightweight building material can be formed by addition of water, has the following composition by weight:

66-89% Portland type I/II cement;
0-23% fly ash; and
5.8-11.5% cellulose fibre. About 68 lb (31 kg) of dry mixture is mixed with 10 gal (38 l) water to form a pourable slurry similar to standard concrete, e.g. for forming into blocks. The cellulose fibre is in the form of a shredded "lint-like" recycled paper product. The effect of increasing the ratio of cellulose fibre to cement is explained to be the reduction in strength of the product, the increase in thermal resistance, the reduction in cost and the reduction in product block weight, within the stated ranges for the weight composition. The reduction in strength is undesirable, and seems to occur despite a high proportion of expensive cement being utilised.

In US2011/0094421 a cement premix is described formed by mixing a wet pulp of recycled paper with sand, drying the mix to a moisture level low enough that reaction with cement would not be initiated, then adding dry cement. The pre-mix may be used either by mixing with water and using as mortar or concrete or by filling into a form followed by addition of sufficient water to form green concrete, in situ. The weight ratio of recycled paper (dry) to sand to cement is 1:(20-35):(3-7). One advantage of the forming process described is the avoidance of the need to add water to the premix before filling the form, and there is no need to control the total amount of water as this is self-stabilising.

In WO2008/104772 we describe a building panel made of a hydraulic binder such as lime or cement, and various recycled components including pulverised glass, gypsum board, and waste paper or card product, in the form of fibres having length less than 5 mm. The waste paper or card is provided as a pulp and is mixed with pulverised glass and cement in a volume ratio of 7:2:1, and with water to form a mortar which is then cast into a mould. The water is added to the premixed blend of other components in a cement mixer. After the mortar is poured into a form for the panel it is said to be manually or mechanically compressed. The extent of compression is not mentioned. Several additional layers including wire mesh and for steel rods and for service trunking are added on top of the first layer as well as a surface layer of gypsum. Higher proportions of fibre pulp may be used to form lower density prefabricated sections which are then embedded in the mortar by pre-positioning in the form to produce lighter overall density panels. The panels are said to have high R values.

In US 2002/0139082 a composite building block has a light-weight core and thin fibre cement facings on each side of the core. The fibre cement is made in several steps first by dispersing cellulosic fibres, whose origin may be recycled waste paper among others, in a hydrapulper at a consistency of 1 to 6%. The product may then be partially dewatered or flash dried to a moisture content of around 5 to 50% to form individualised fibres. These are mixed as a slurry or semi-dry paste with cement, silica (sand) and water and shaped with optional post-pressing before curing. The formulation consists of hydraulic binder (cement) 10-80% by weight, preferably 25-40%, filler (e.g. sand) up to 80% by weight, preferably 45-65%, and fibre 1 to 25% by weight preferably 5-12%. The ratio of fibre to cement is relatively low.

SUMMARY OF THE INVENTION

In view of the problem described above, it is a first object of this invention to provide a material that will utilise cellulose fibre waste to make a material that will be used to produce lightweight products for the construction industry that will efficiently solve the problem of thermal insulation in buildings as well as providing load-bearing and/or structural products.

It is a second object of this invention to provide a process for efficiently and reliably making construction block products, for example, blocks of different sizes and shapes through a series of steps inclusive of preparation of the raw material prior to the mixture preparation so that the final product will achieve the required load-bearing and/or infill-blocks standard as required in the country of use. These blocks should be suitable for interior and/or exterior works such as construction of external load-bearing walls or for in-fill for conventional building concrete or steel structures. They should meet the specifications for load-bearing heat and sound insulation, fire behaviour, water absorption and organic growth infestation.

The first object set above is achieved, according to one aspect of this invention, by the process defined in claim 1. The cellulose fibre containing waste admixed with cement in step b) has a water content (by weight) in the range 10% to 50%, preferably no more than 35%, more preferably no more than 25% for instance 10 to 15%. The water content is determined as described below.

In the process the cement is preferably used in an amount in the range 10% to 35% depending on the strength desired, based on the total weight of granular mix (not including the weight of water).

The mix of step b) may also contain a filler in an amount in the range 10% to 20% by weight depending on the strength desired, for instance, sand of any kind with any percentage of humidity as long as this humidity percentage is known. Other filler that can be used is ash preferably of paper but not exclusive to a maximum of 10% by weight again depending on the desired strength. Other additives that may be included in the mix are anti-fungals curing aids, wetting agents, plasticisers, water proofing and other conventional additives as needed, quantities depending on the condition and length of time and conditions of the paper storage prior to pulping/shredding, which in turn affect the moisture level and microbial growth, and hence anti-microbials/anti-fungals required.

The process preferably uses, as the basis for the cell lose fibre-containing waste, waste paper or cardboard waste, e.g. in the form of crumble pulp. This may comprise short, long or mixed length fibres. The crumble may be used in an amount (by volume) between 50% to 90%, as cellulose fibre-containing waste, based on the total mix formed in step b), depending on the strength required. The use of paper or card to form the waste used in the block reduces the weight of the block and the wall compared with a concrete block but also increases both thermal insulation and sound insulation. Crumble is a form which has a granular conformation, with a low bulk density, i.e. density in the hopper or vessel from which it is dispensed moisture is absorbed on and in the granules so there is no continuous water phase, but rather there is air entrained with the granules to provide the low bulk density. In practice the amount of crumble is conveniently metered in by volume The weight (dry fibre) can be determined from information about the density and moisture level.

There has been a technical prejudice against the use of paper and cardboard product in house walls because of fears of the risk of fire. We have shown that the base block made in the invention comprising cement, sand and paper product or cardboard product will smoulder, but not catch fire. We believe this is due to the good dispersion of fibre in cement achieved in the method According to one preferred embodiment of this first invention, there is described a mixture of aggregates such as cement, sand, ash and paper waste to make a lightweight paper concrete to produce construction blocks that may be a load-bearing block. The strength of the product and load bearing may come from the percentage of waste paper or card product within the base mixture. There would be a selection of percentages of cellulose fibre waste within the base mixture to provide a variety of strength necessary to respond to the building needs. In a preferred embodiment of the base mixture the amount of cellulose fibre-containing waste is used in an amount between 55% to 60% (of the total mixture for a block) to achieve a high strength construction block of around 10N with a density of about 1000 kg/m$^3$ (1004.22 kg/m$^3$); 60% to 75% to achieve a medium strength of 7N with a density of about 850 kg/m$^8$ (845.66 kg/m$^3$); and 75% to 90% to achieve a low strength (commonly called the in-fill blocks) of 3.6 N or less with a density of about 740 kg/m$^3$ (739.95 Kg/m$^3$). In this specification the strength values are determined by application of compression and the values given are the force withstood before disintegration of the block (BS12390).

The formed product may be a construction block, panel, tile or beam, or may be a wall or foundation formed in situ on a construction site. Most conveniently it is prefabricated for construction by standard mortar-joining techniques.

According to another preferred embodiment of the invention, there is described an interlinked relation between the stages of the production process to achieve the desired results. The amount of humidity the paper pulp or paper crumble and the sand has to be measured and controlled before mixed with the rest of the aggregates and bonding agents. The preferred humidity on the paper pulp or crumble will be 35% for any of the desired strength components. Excess water or humidity will compromise the bonding properties of the cement by being washed from the mixture. Too link water will not be enough to activate the cement bonding properties, i.e. achieved on hydration. This exact water cement ratio also has an influence on how much the base mix has to be mixed. The moisture content of the cellulose fibre-containing waste (i.e. the crumble) is determined by subjecting a sample of about 20-100 g to microwave energy of 500-1000 W for at least 5 mins (until there is substantially no further weight reduction), and weighing before and after to determine water loss. The moisture content of other filler materials is determined in the same way.

According to another preferred embodiment of this invention, there is described a method or making a construction block that may be made of as material which in addition includes another aggregate material. The aggregate material may be any suitable material, such as sand, but in a preferred embodiment the aggregate material includes glass particles. The glass particles are preferably from crushed waste glass, as much as 3% by weight of the total amount of the cement used in the mixture of the material is glass particles. Glass particles improve the sound insulation properties of the material. The use of these different waste materials can reduce the carbon footprint of a build. The additional aggregate is added in step b), usually after contact of the slurry with the cement, so that the granular mixture contains the aggregate and percentages of the aggregate are based on the weight of total mixture.

The second object set forth above is achieved, according to one aspect of this invention, by a process for making construction block material of standard size comprising three steps with two stages in each step of the production method of a material including cement, sand and paper product or card product. The first step is the preparation of the raw material, for example waste paper, on a first stage the raw material will be made into a pulp state through a process of pulping in preparation to be mixed with the other aggregates of the base mixture at the second step, (before entering step two of mixing the paper pulp with the other aggregates the paper pulp needs to be de-watered to 50% by weight or less humidity by means of a filter press or other methods for dewatering paper pulp such as natural drying).

In the second step the prepared main raw material will be poured into a mixer to the right percentage together with the right percentage of each aggregate/filler such as sand or crashed glass from preferably waste cement and ash and relevant additives depending on the strength of the block the base mixture is prepared. The aggregate/filler is generally added in an amount in the range 0.1 to 2 parts by weight per part of cement (on a dry basis), preferably 0.3 to 0.7 parts per part cement. The mixing step b), which may be carried out in the presence of or prior to addition of additional aggregate, is conducted in a high speed mixer, for instance having a rotating shaft with mixing blades or paddles. These may be rotated at a speed of for instance between 750 and 3000 rpm. Mixing may be carried out for a time of no more than 5 to 10 minutes. The revolutions and the length of time will depend on the type, size and strength of construction block required. Additional water may be added at step b), the amount being controlled according to a predetermined moisture levels of the cellulose fibre material and filler. The process preferably involves measuring the moisture levels of these components.

In step c) of the process the base mixture is dispensed e.g. into a hopper, from where it is released to the forms, such as moulds to form for instance blocks of predetermined weight to achieve the required type, size and strength. Forms generally comprise a frame of vertical walls which sit on a fixed base. They will normally be reused man times.

In step d) of the preferred embodiment the mixture in the moulds is vertically compressed, e.g. to between 1 to 15 tonnes of force across the surface, depending on the required strength needed for the construction block. These blocks are released from the forms by shifting the forms upward immediately after the compression, leaving the green blocks on the fixed base. The pressure is preferably in the range 1-15 MPa (1-15 N/mm$^2$).

The force increases the bulk density of the material by a factor of at least 2, that is the material is compressed to less than half its original depth, for instance a factor of at least 2.5, preferably around 3.

In a step e) of the process, the construction block is cured; this could be achieved by different methods: —i) fast curing by sending the blocks to an oven chamber of not more than 40° C. and left there for up to 48 hours and then piled in pallets, then wrapped in plastic to be protected from the weather; ii) fast curing by adding silica to speed up the process and then sending to the oven for 48 hours; or iii) slow curing by natural drying—leaving the blocks on a shelf where the air can circulate but under a roof protected from the weather for 14 days to allow them to be strong enough to be piled in pallets and wrapped in plastic and left outside to continue the curing process for another further 14 days.

According to one preferred embodiment of this second invention, the cellulose fibre-containing waste is provided as paper crumble by means of a hydro-pulper that will help the separation of the fibre and will clean the pulp of foreign elements such as adhesive, plastics, ink, filler, site and glass. It is preferred that, in the hydrapulper the fibre length is reduced as little as possible In general retaining longer fibres increases the rate of dewatering of the pulp and increasing the strength of the block. Cleaning the pulp and separating the fibres improves the blending with the cement panicles and hence the strength of the product According to another preferred embodiment of this invention, there are described the steps of de-watering the paper crumble or pulp by means of a filter press or a drying belt or by natural drying. This is a key element of the process to achieve the strength of the final product. The ratio of water to cement is the element in controlling the strength of the block, however because the water in this raw material is in the fibre it is crucial to continue to control humidity to achieve the final result. If necessary the paper crumble is de-watered again until a 50% or less humidity is achieved. The level of humidity, i.e. the moisture content, is measured as described above. The preferred level is in the range of 10 to 35% of humidity.

According to another embodiment of this invention, there is a further method of preparing the cellulose fibre-containing waste raw material by using a dry pulper to fibrillate the raw material, i.e. form crumble. In this method water is added to the dry fibrillated fibre in an amount determined to provide adequate water to hydrate the cement. The amount of water is less than the weight of fibre, so that the water amount is less than 50% of the total of fibre and water.

In the process the blending step is carried out to provide good mixing of the components of the base mixture. The more revolutions and thus energy used in the mixing, the less time needed to achieve a semi-dry, very light mixture.

According to another preferred embodiment of the invention, in the making of the blocks the amount of the base mixture needs to be exactly controlled to achieve the exact height after releasing the compression. The compressed mixture tends to expand once the compression shaft is released. Thus the mixture is compressed to a higher density than ultimately required and the pressure is removed to allow some expansion or the pressure is just enough to compress to the desired density and is kept in place while initial curing takes place.

According to a further preferred embodiment of this invention, a variety of shapes and sizes that could be used with bespoke shape moulds of any size, which also can include artistic features to make unique pieces. Colour pigments could be used to complement the artistic features and to widen the variety of shapes and colours. On standard moulded construction blocks the height and larger width of a block will be limited by Health and Safety Standards for product weight. The limits for the width or depth of a block will be limited by the block-making machine capability for instance 270 mm.

The block-making machine may be designed and built by engineers so as to achieve the requirements for making the construction block described herein.

The ratio of water to cement is the key to controlling the strength of the block, however because the water in this raw material is in the fibre it is crucial to continue to control humidity in step b) to achieve a useful final result. Also the extent of mixing in step b) is crucial to the dispersion of the fibre and may also affect the level of elimination of water by centrifugation. The compression of the mixture in step d) is also crucial in producing the end product, helping in the bonding of the fibres by means of the cement.

The present invention provides products for construction having useful mechanical characteristics, which are light and easy to work, e.g. cut, which have good sound and heat insulation properties and involve low energy input in their production, can be made by using available or easing built machinery and use waste materials as raw materials. The products can be used within days of production and do not require curing for several weeks or baking before exposure to the elements.

BRIEF DESCRIPTION OF THE DRAWINGS

Embodiments of the invention will now be described by way of example and with reference to the accompanying drawings, in which:

FIG. 1 is a perspective view of several alternative embodiments of construction blocks; and FIG. 2 is a block diagram illustrating basic steps of a process according to this invention.

DETAILED DESCRIPTION OF THE PREFERRED EMBODIMENTS

More definitely to describe how the construction block from FIG. 1 is obtained, according to this invention, as illustrated by FIG. 2, by a method basically comprising steps of: a step of raw material preparation which comprises two stages: —the paper pulping stage 2 and the de-watering stage 3; a step of mixing which comprises of two stages, the calculation of material to be mix 4 and mixing 5 all the aggregates, bonding agents (i.e. hydraulic binder, usually cement) and additives (e.g. water-proofing, other conventional additives to control curing rate plasticisers to control rheology during mixing); a step of block production which comprises two stages: —the block production 6 and the curing stage 7; and a further optional stage of packaging 8 and storage 9.

Details of this invention will be more fully understood from the description given hereunder with reference to the accompanying drawings. In order to make the construction block of FIG. 1, a series of two stages of preparation are needed to produce a cellulose fibre base mixture. A first stage is to prepare the paper pulp or paper crumble raw material to make the base mixture. Recycled paper or cardboard are dropped into a hydro-pulper 2 (of standard make) and are mixed with water, preferably recycled water from this same process. The pulper will separate the fibre from other contaminants e.g. ink and filler and the excess of lime within the recycled paper preferred that the pulping process does not reduce the fibre length. The fibre is used in the next stages. It is if using the wet pulper the result will be a soggy paper pulp of cellulose fibre that will be transported, he de-watering stage 3 by a belt or by vacuum. The de-watering stage 3, may be conducted in one of three main was or a combination. The first way is the filter press method, wherein regular portions of the paper pulp will be moved by vacuum into the machine and compressed until the excess water is removed, a paper crumble "cake" will be produced and removed from this machine; this procedure will be repeated until 50% or less humidity its achieved. The second method that maybe utilised to de-water uses a warming belt. In this method the content of the hydro-pulper from stage 1 is continually moved to the belt so that, with heat throughout the belt, it evaporates the excess water. The length of the belt depends on the amount of paper pulp produced in each batch and the excess water that the paper pulp contains. The third method of de-watering is by natural drying and this involves leaving a large amount of paper pulp thinly spread on a sheet of plastic for the necessary length of time until the right humidity is achieved. Once the paper pulp is de-watered the main raw material of the base mix is ready to be mixed with any filter aggregates and the bonding agents (hydraulic binder, cement).

A second way of preparing the raw material is by pouring the raw material into a dry pulper 1 that will shred the paper or card into 3 to 10 mm pieces; this powder-like dry mixture will be proportionally mixed 4 with the other aggregates, bonding agents and additives and with a calculated amount of water to activate the cement to bond the mixture.

Once the main raw material of paper pulp or shredded paper/card has the right amount of humidity and all the other aggregates have their humidity measured, a calculation of water is done to prevent the possibility of over-watering or under-watering the base mixture. Calculations of percentages of the different components 4 of the base mixture are measured in relation to the required strength of the construction blocks being produced. Once the previous stage is done all the aggregates, bonding agents and additives are poured into the mixer 5. This is of standard design, generally having blades, mounted axially in vertical cylinder. The blades or paddles are, however, generally rotated at a higher speed than for standard concrete block production e.g. at 750 to 3000 rpm. The speed of the mixer will dictate the length of the mixing period which could be between 5 to 15 minutes until a well distributed mixture is achieved. The base mixture will have a semi-dry sticky texture of relatively low bulk density, so it is compressible Once the base mixture is ready it needs to be used to produce blocks within no more than 45 minutes, i.e. before the cement starts to set. The base mixture is dropped into a hopper above the block-making machine 6 the hopper measures by weight the base mixture to be filled into the moulds. The weight of the mix is in relation to the numbers of moulds the block-making machine has, and the required strength of the block to be produced. The hopper is regularly fed by the mixer by topping up the mixture already in the hopper, at the same time the hopper releases the right amount of base mix each 20 seconds to the moulds. Once these are filled to the right height this base mixture is compressed individually from the top with around 1 to 15 tonnes of pressure 1-15 N/mm², 1-5 MPa), depending on the required strength of the construction block in production; the compressed moulded base mixture has a standard shape for blocks which are usually 440 mm wide×215 mm height×100 mm depth; this last measurement could be of different depth up to 270 mm. The blocks are de-moulded immediately and are moved to a crate where a curing process 7 begins. The curing process can take place on shelves, with crates that are moved to either an oven chamber where it will remain at 40° C. for up to 48 hours and then moved to a storage warehouse, or they are stored on shelves in a warehouse for up to 14 days. In both methods of curing. The warehouse preferably would be open to allow air to move freely between the blocks to help with the curing process 7.

Once the blocks are reasonably dry with which ever method chosen, the blocks are moved to a packaging belt 8. The blocks are strong enough to be piled in pallets; blocks will be piled with the conventional four layers of blocks, where a pallet will contain up to 75 blocks, all depending on the size of the blocks. Once wrapped with plastic or a waterproof paper, the pallets can be move to be stored 9 in a yard without any weather protection. At this yard the blocks will be left to continue with the curing process 7 for up to 28 days from the day they were produced. Blocks made by the process have fire performance no worse than treated timber used in buildings.

While the typical embodiment of this invention has been described hereinabove, various variations and modifications will be apparent to those skilled in the art in the light of the foregoing description. For example, it is possible to put special artistic pattern sheets on the sides of the mould and then fill the individual moulds directly and one by one with the base mixture to produce special pattern blocks; also moulds can be made of wood to allow for bespoke shapes blocks to be made by hand.

EFFECT OF THE INVENTION

The following are examples of mixtures used to make construction blocks having the defined structural properties.

Example 1

A paper pulp is made by shredding waste paper in water, shearing at high speed and dewatering to produce paper crumble having 10% by weight water. This is mixed in an amount 55 parts by weight with 27 parts ordinary Portland cement (OPC), 12 parts sand and 6 parts ash in a high shear mixer. 9.5 kg of the mixture is weighed into a mould 440 (l)×645 (h)×100 (w) mm in dimensions and is compressed at pressure of about 15 t. The block, with as height of 215 mm (from the starting material when filled of about 645 mm), is subsequently demoulded and cured at ambient temperature for 14 days. The block is then subjected to tests of insulation value per BS EN ISO 6946:1997. The lamda ($\lambda$) is measured to be 0.255 W/mK with which the u value can be calculated. The strength is shown to meet BS EN 12390-3 and -5 of above 10 N.

Example 2

The same crumble is used as in Example 1, in an amount of 67 parts, with 20 parts OPC, 10 parts sand and 3 parts ash. 8 kg mixture is filled into the mould and the mixture is compressed to 215 mm high. The block has a lamda ($\lambda$) of 0.145 W/mK. This meets the strength test at 7 N (BS12390).

Example 3

The same crumble is used as in Example 1, in an amount of 77 parts, with 10 parts OPC, 10 parts sand and 3 parts ash. 7 kg mixture is filled into the mould then compressed to 215 mm high. The block has a lamda ($\lambda$) of 0.0724 W/mK and satisfies the strength test at 3.6 N.

The invention claimed is:

1. A process for forming a structural concrete product by:
   a) providing a cellulose fibre-containing waste crumble and containing a known amount of water which is in the range of from 10% to 50% based on the total weight of the waste by partial dewatering of a fibre-and-water pulp, wherein the fibre-and-water pulp is derived from recycled paper or cardboard or from paper production;
   b) mixing the cellulose fibre-containing waste crumble with a cement in particulate form and with additional filler selected from sand, glass, ash and combinations thereof to distribute the cement particles and cellulose fibre and form a granular base mixture, wherein the ratio of cellulose fibre to cement is at least 1 in terms of dry weights;
   c) filling the granular mix into a form;
   d) applying a compressive force on the granular base mixture in the form so as to increase the density of the formed material; and
   e) allowing the formed and compressed material to cure and harden to form a structural material.

2. A process according to claim 1, wherein the water-content of the waste crumble provided in step a) is in the range 10 to 40% by weight.

3. A process according to claim 1, wherein step a) involves comminuting cellulose materials in water as a slurry followed by reduction of water-content of the slurry, to form crumble having the required water content, in an integrated process prior to step b.

4. A process according to claim 1, wherein the weight ratio of cellulose fibre waste to cement used in step b) is more in the range 1.5 to 10.

5. A process according to claim 1, wherein step b) is carried out in a blender, having a blade or paddle in a bowl capable of rotating at a rate in the range 750 to 3000 rpm.

6. A process according to claim 1, wherein step b) is conducted batch wise.

7. A process according to claim 1, wherein the compressive force in step d) has a weight of at least 1 up to 15 t, applied across the surface of the mix in the form.

8. A process according to claim 1, wherein the density is increased in step d) by a factor of at least 2.

9. A process according to claim 1, wherein step c) is carried out at a temperature in the range 10 to 50° C., for a period in the range 10 hours to 2 weeks.

10. A process according to claim 1, wherein the cement is Portland cement.

11. A process according to claim 1, wherein the filler is added in an amount in the range 10 to 20% by weight of the total dry weight of materials in the granular base mixture.

12. A process according to claim 1, wherein additional water is added in step b), in an amount controlled according to the moisture content of the crumble, cement and other additives, and according to ambient temperature.

13. A process according to claim 1, wherein the form has length in the range 0.2 to 2 m, a breadth in the range 0.1 to 0.5 and a depth in the range of from 0.2 to 0.8 m.

14. A process according to claim 9, wherein step c) us carried out without application of external heat.

15. A process according to claim 13, wherein the form has a length in the range of from 0.4 to 0.6 m and a breadth in the range of from 0.2 to 0.25 m.

16. A process according to claim 8, wherein the density is increased in steps d) by a factor of at least 2.5.

17. A process according to claim 1, wherein the water content of the cellulose fibre-containing waste crumble formed in step a) is less than about 35%.

18. A process according to claim 1, wherein no water is added in step b).

19. A process for forming a structural concrete product by:
a) providing a cellulose fibre-containing waste crumble and containing a known amount of water which is in the range of from 10% to 50% based on the total weight of the waste by partial dewatering of a fibre-and-water pulp, wherein the fibre-and-water pulp is derived from recycled paper or cardboard or from paper production;
b) mixing the cellulose fibre-containing waste crumble with a cement in particulate form and with additional filler selected from sand, glass, ash and combinations thereof to distribute the cement particles and cellulose fibre and form a granular base mixture, wherein the crumble is used in an amount by volume of 55 to 60% of the total volume of materials used to form the granular base mix;
c) filling the granular mix into a form;
d) applying a compressive force on the granular base mixture in the form so as to increase the density of the formed material; and
e) allowing the formed and compressed material to cure and harden to form a structural material having a density about 1000 kg/m$^3$.

20. A process for forming a structural concrete product by:
a) providing a cellulose fibre-containing waste crumble and containing a known amount of water which is in the range of from 10% to 50% based on the total weight of the waste by partial dewatering of a fibre-and-water pulp, wherein the fibre-and-water pulp is derived from recycled paper or cardboard or from paper production;
b) mixing the cellulose fibre-containing waste crumble with a cement in particulate form and with additional filler selected from sand, glass, ash and combinations thereof to distribute the cement particles and cellulose fibre and form a granular base mixture, wherein the crumble is used in an amount by volume of 60 to 75% of the total volume of materials used to form the granular base mix;
c) filling the granular mix into a form;
d) applying a compressive force on the granular base mixture in the form so as to increase the density of the formed material; and
e) allowing the formed and compressed material to cure and harden to form a structural material having a density about 850 kg/m$^3$.

21. A process for forming a structural concrete product by:
a) providing a cellulose fibre-containing waste crumble and containing a known amount of water which is in the range of from 10% to 50% based on the total weight of the waste by partial dewatering of a fibre-and-water pulp, wherein the fibre-and-water pulp is derived from recycled paper or cardboard or from paper production;
b) mixing the cellulose fibre-containing waste crumble with a cement in particulate form and with additional filler selected from sand, glass, ash and combinations thereof to distribute the cement particles and cellulose fibre and form a granular base mixture, wherein the crumble is used in an amount by volume of 75 to 90% of the total volume of materials used to form the granular base mix;
c) filling the granular mix into a form;
d) applying a compressive force on the granular base mixture in the form so as to increase the density of the formed material; and
e) allowing the formed and compressed material to cure and harden to form a structural material having a density about 740 kg/m$^3$.

* * * * *